United States Patent [19]

Åhs

[11] Patent Number: 4,546,238

[45] Date of Patent: Oct. 8, 1985

[54] CIRCUIT ARRANGEMENT FOR TEMPERATURE CONTROL OF AN ELECTRIC HEATING ELEMENT

[75] Inventor: Vilgot Åhs, Koppom, Sweden

[73] Assignee: Töcksfors Verkstads AB, Töcksfors, Sweden

[21] Appl. No.: 462,680

[22] Filed: Jan. 31, 1983

[30] Foreign Application Priority Data

Feb. 8, 1982 [SE] Sweden ............................... 8200711

[51] Int. Cl.⁴ ............................................. H05B 1/02
[52] U.S. Cl. .................................. 219/497; 219/499; 219/501; 219/508; 323/246
[58] Field of Search .............. 219/508, 494, 509, 501, 219/514, 491, 519, 497, 499; 323/246, 245; 307/117

[56] References Cited

U.S. PATENT DOCUMENTS

| | | | |
|---|---|---|---|
| 3,789,190 | 1/1974 | Orosy et al. | 219/497 |
| 3,903,395 | 9/1975 | Hamstra | 219/497 |
| 3,959,692 | 5/1976 | Wetzel | 219/497 |
| 4,350,876 | 9/1982 | Kubota et al. | 219/497 |
| 4,393,300 | 7/1983 | Proctor | 219/497 |

OTHER PUBLICATIONS

Electronic Circuits Manual, p. 939, Copywright 1971, McGraw-Hill, by Marcus.

*Primary Examiner*—M. H. Paschall
*Attorney, Agent, or Firm*—Burns, Doane, Swecker & Mathis

[57] ABSTRACT

The invention relates to a circuit arrangement for controlling the temperature of an electric heating element (10), where the resistance of the element is utilized as a measure of the temperature. When the element is switched on, the current flowing through the element is scanned by a small measuring resistor (16). The voltage drop ($U_1$) arising over this resistor is compared to a reference value ($U_2$) for interrupting the effect supply to the element when the element has achieved the desired temperature. Thereafter a weak test current is fed through the element, and a voltage drop ($U_3$) dependant on the element temperature is compared to an additional reference value ($U_4$) for again connecting the effect feed when the element temperature has dropped to a predetermined level. By means of the invention, which can be used for the temperature control of, for example, electrically heated car seats, both continuous temperature control and adjustable on/off-hysteresis are obtained.

17 Claims, 1 Drawing Figure

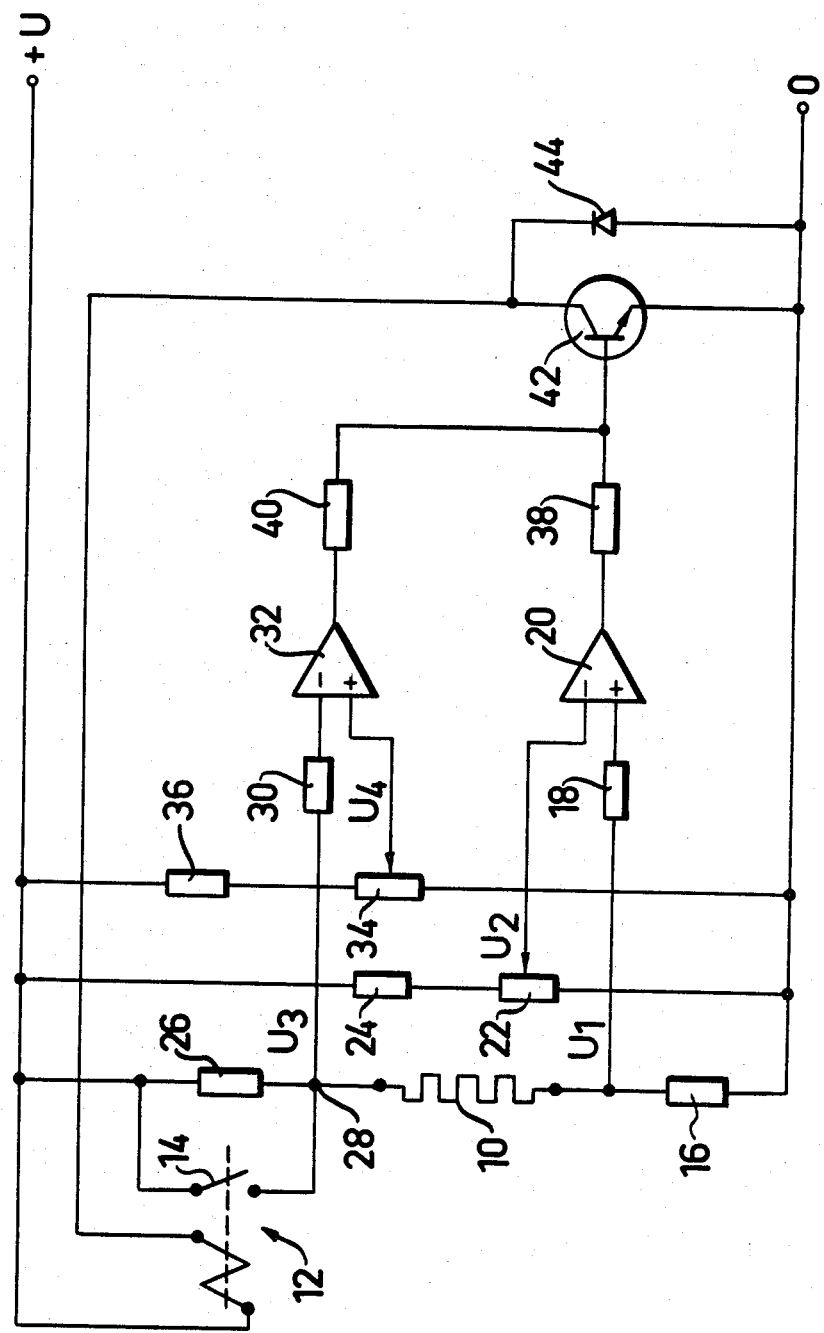

CIRCUIT ARRANGEMENT FOR TEMPERATURE CONTROL OF AN ELECTRIC HEATING ELEMENT

This invention relates to a circuit arrangement for controlling the temperature of an electric heating element of the type in which the current flowing through the heating element is sensed when the power is applied thereto and feeding a weak test current through the heating element when the power is off in order to detect its temperature.

At a method applied generally for controlling the temperature of a heating element, a temperature sensing member is used which is positioned adjacent the heating element and controls the same in response to the temperature sensed. For achieving a higher control accuracy, it is known to eliminate the temperature sensing member and, instead, to measure the temperature of the heating element indirectly by scanning the temperature-responsive resistance of the element, see for example U.S. Pat. No. 3,924,102. At this known arrangement, a true value signal responsive to the resistance of the element is formed in a current sensor and fed to a comparison circuit where it is compared to a nominal value signal.

When the heat element is assumed to have a positive temperature coefficient, rising temperature causes the true value signal to decrease. When the true value signal and the nominal value signal are of equal size, the current feed to the heating element is interrupted. The true value signal is cancelled entirely, which implies that the circuit arrangement is locked in this switched-off state unless some step is taken for connecting in circuit again.

The known circuit arrangement comprises a circuit, which periodically emits sampling pulses, by which the feed source is connected for a short duration to the heat element. When the temperature has dropped sufficiently much, the feed remains connected, and the aforesaid procedure is repeated. Otherwise the feed stops when the sampling pulse ceases.

The present invention has the object to simplify the circuit arrangement by eliminating the necessity of sampling pulses and to simultaneously render possible a control, which is more accurate than it heretofore has been possible to achieve by using sampling pulses occurring only at certain definite moments.

In accordance with the invention, this object is achieved by producing a first reference signal corresponding to the desired maximum temperature of the heating element and a second reference signal corresponding to the desired minimum temperature of the heating element. The first reference signal is compared with the current flowing through the heating element when power is applied thereto and causes the power to be turned off when the first reference signal is greater than the current signal. The second reference signal is compared to the test current and causes the power to be applied to the heating element when the second reference signal exceeds the test current.

In addition to the aforesaid advantages involved with the continuous temperature control, the invention also offers the advantage that the on-off hysteresis of the circuit arrangement can be adjusted optionally, owing to the fact that two reference levels independent of each other are used, viz. one for switching on and one for switching off.

The invention is described in greater detail in the following, by way of an embodiment thereof and with reference to the accompanying drawing, the only FIGURE of which is the connection diagram for a control arrangement according to the invention.

A heating element 10 in the form of a resistance wire is supplied from a voltage source (+U, O) via the operating contact 14 of a relay 12. A low-ohmic resistor 16 is located in series with the heating element 10 in order to form a voltage $U_1$ proportional to the feed current, which voltage $U_1$ is fed via a resistor 18 to one input of a differential amplifier 20, to the second input of which a manually adjustable reference voltage $U_2$ is supplied from a potentiometer 22, which is connected in series with a resistor 24 to the feed voltage.

The operating contact 14 of the relay 12 is connected in parallel with a resistor 26, the resistance of which is selected so that a suitable closed-circuit current flows through the heating element 10 when the relay 12 is deactivated. In the connecting point 28 this closed-circuit current gives rise to a voltage $U_3$, which is supplied via a resistor 30 to one input of a second differential amplifier 32. A potentiometer 34 connected to the feed voltage via a resistor 36 emits a manually adjustable reference voltage $U_4$, which is supplied to the second input of the differential amplifier 32.

The outputs of the differential amplifiers 20 and 32 are connected via a resistor 38 and, respectively, 40 to the base of a switch transistor 42, which is connected in series with the relay 12. A protective diode 44 is coupled in known manner via the transistor 42 to protect the transistor against reverse voltages.

The resistor 16, which serves only for yielding a voltage $U_1$ proportional to the current, has a very low resistance (for example one or some tenths of one ohm) compared to the resistance of the heating element, in order not to consume unnecessary energy and, compared to the element 10, to have a negligible effect on the voltage $U_3$.

The circuit arrangement operates follows.

It is initially assumed that the current feed was cut off and, thus, the heating element 10 is cold. The voltage drop over the heating element, the resistance of which has a positive temperature coefficient, therefore is relatively small, which implies that the voltage $U_3$ in point 28 is lower than the reference voltage $U_4$. The output signal from the differential amplifier 32, thus, is high and causes the transistor 42 to assume conductive state, which in its turn implies the switching on of relay 12. Hereby the contact 14 is closed so that the resistor 26 is by-passed, and a strong heating current starts flowing through the heating element 10. The point 28 hereby assumes a high potential, so that the output signal of the amplifier 32 runs low, but the transistor 42 now is maintained conductive by the differential amplifier 20, the output signal of which is high, because the voltage drop $U_1$ over the resistor 16 exceeds the reference voltage $U_2$.

As the temperature of the element 10 increases, the voltage $U_1$, however, decreases and gradually becomes lower than the reference voltage $U_2$, whereby the output signal of the differential amplifier 20 then becomes so low that the transistor 42 is throttled and thereby deactivates the relay 12. Hereby the operating contact 14 is opened so that the heating element 10 again is energize only by a weak closed-circuit current emitted from the resistor 26. The temperature of the element 10 drops again, whereby the voltage $U_3$ decreases, and at $U_3 < U_4$ the differential amplifier 32 causes the transistor 42 again to switch on, whereby the aforedescribed procedure is started again.

The invention is intended to be used especially in connection with electrically heated car seats, but of course also can be utilized in all connections where an accurate temperature control of an electric heating element is desired.

The coupling described above and shown in the FIGURE is to be regarded as only one example of the working of the invention, and many variations apparently are imaginable within the scope defined in the attached claims. The relay, for example, can be replaced by some suitable semiconductor element for switching the heating on and off. The majority of the circuit components, further, can be assembled to a common integrated circuit.

What I claim is:

1. A circuit arrangement for controlling the temperature of an electric heating element, comprising:
   a switch member for switching on and off substantially the entire voltage of a current source over the heating element,
   first means for producing a first signal proportional to the current flowing through the heating element,
   second means for feeding a weak closed-circuit current serving as test current through the heating element when the switch member is in off-position in order to form a second signal, which is substantially proportional to the voltage produced by the test current over the heating element,
   characterized in that the arrangement comprises:
   third means for producing a first reference signal independent of the element temperature and corresponding to the desired maximum temperature of the heating element,
   fourth means for producing a second reference signal independent of the element temperature and corresponding to the desired minimum temperature of the heating element,
   a first reference circuit for comparing the first signal to the first reference signal and emitting an output signal for actuating the switch member to off-position when the first signal is smaller than the first reference signal, and a second reference circuit for comparing the second signal to the second reference signal and emitting an output signal for switching on the switch member when the second signal is smaller than the second reference signal.

2. A circuit arrangement as defined in claim 1, characterized in that said second means comprise a resistor connected in parallel with the switch member.

3. A circuit arrangement as defined in claim 1, characterized in that the first and second reference circuits comprise each a differential amplifier, the outputs of which are connected to a common control transistor for the switch member.

4. A circuit arrangement as defined in claim 1, characterized in that said fourth means comprise a potentiometer coupling fed by the current source for adjustable on-off hysteresis, and that the second reference signal is the output voltage of the potentiometer coupling.

5. A circuit arrangement as defined in claim 2, characterized in that the first and second reference circuits comprise each a differential amplifier, the outputs of which are connected to a common control transistor for the switch member.

6. A circuit arrangement as defined in claim 2, characterized in that said fourth means comprise a potentiometer coupling fed by the current source for adjustable on-off hysteresis, and that the second reference signal is the output voltage of the potentiometer coupling.

7. A circuit arrangement as defined in claim 3, characterized in that said fourth means comprise a potentiometer coupling fed by the current source for adjustable on-off hysteresis, and that the second reference signal is the output voltage of the potentiometer coupling.

8. A circuit arrangement as defined in claim 5, characterized in that said fourth means comprise a potentiometer coupling fed by the current source for adjustable on-off hysteresis, and that the second reference signal is the output voltage of the potentiometer coupling.

9. A circuit arrangement for controlling the temperature of an electric heating element comprising:
   switch means for switching on and off substantially the entire voltage of a voltage supply source across said heating element;
   first means for creating a first signal proportional to the current flowing through said heating element;
   second means for feeding a quiescent current serving as a test current through said heating element when said switch means is in an off position in order to form a second signal which is substantially proportional to the voltage across the heating element produced by said test current;
   third means for producing a first reference signal independent of the heating element temperature and corresponding to the desired maximum temperature of the heating element;
   fourth means for producing a second reference signal independent of the heating element temperature and corresponding to the desired minimum temperature of the heating element;
   a first comparator circuit for comparing said first signal with said first reference signal, an output signal being emitted which switches said switch means to said off position when the first signal is smaller than the first reference signal in order to reduce the heating current through the heating element when a predetermined temperature is attained in said heating element; and
   a second comparator circuit for comparing said second signal with said second reference signal, an output signal being emitted which switches said switch means to an on position when the second signal is smaller than the second reference signal in order to increase the current through the heating element when a predetermined lower temperature is attained.

10. The circuit of claim 9, wherein said second means comprises a resistor connected in parallel with the switch means.

11. The circuit of claim 10, wherein said first and second reference circuits each comprise a differential amplifier, the outputs of which are connected to a common control transistor for the switch means.

12. The circuit of claim 11, wherein said fourth means comprise a potentiometer connected across said voltage supply source for adjustable on-off hysteresis, and said second reference signal is the output voltage of said potentiometer.

13. The circuit of claim 10, wherein said fourth means comprise a potentiometer connected across said voltage supply source for adjustable on-off hysteresis, and said second reference signal is the output voltage of said potentiometer.

14. The circuit of claim 9, wherein said first and second reference circuits each comprises a differential amplifier, the outputs of which are connected to a common control transistor for said switch means.

15. The circuit of claim 14, wherein said fourth means comprise a potentiometer connected across said voltage supply source for adjustable on-off hysteresis, and said second reference signal is the output voltage of said potentiometer.

16. The circuit of claim 1, wherein said fourth means comprises a potentiometer connected across said voltage supply source for adjustable on-off hysteresis, and said second reference signal is the output voltage of said potentiometer.

17. A monitor circuit for controlling the operating temperature of an electric heating element having first and second electrical connection terminals, comprising:
   a first resistor connected in series with said heating element at said first terminal;
   a second resistor connected in series with said heating element at said second terminal;
   a voltage supply source connected across the series combination of said first and second resistors and said heating element;
   a switch member connected in parallel to said first resistor for selectively bypassing said first resistor, said switch member, when in a closed condition, permitting a heating current to pass through said heating element and, when in an open condition, permitting a test current which is relatively small compared to said heating current to pass through said heating element, said test current being substantially insufficient to generate heat in said heating element;
   means for producing a first reference signal independent of the heating element temperature and corresponding to the desired maximum temperature of said heating element;
   means for producing a second reference signal independent of the heating element temperature and corresponding to the desired minimum temperature of said heating element;
   a first comparator circuit for comparing said first reference signal with a signal indicating the amount of current flowing through said second resistor, the amount of current flowing through said second resistor being inversely proportional to the resistivity and thus the temperature of said heating element, and for emitting an output signal which causes a switch controller to open said switch member when the signal indicating the amount of current flowing through said second resistor is smaller than said first reference signal thereby switching off said heating current when a predetermined temperature is attained in said heating element; and
   a second comparator circuit for comparing said second reference signal with a signal substantially proportional to the voltage drop across the heating element produced by said test current, the voltage drop being directly proportional to the resistivity of said heating element, and for emitting an output signal which causes said switch controller to close said switch member when the signal proportional to the voltage drop across the heating element is smaller than said second reference signal thereby switching on said heating current when a predetermined lower temperature is attained.

* * * * *